United States Patent
Mangipudi et al.

(10) Patent No.: US 7,058,704 B1
(45) Date of Patent: Jun. 6, 2006

(54) METHOD AND APPARATUS FOR IMPLEMENTING A SERVICE-LEVEL AGREEMENT

(75) Inventors: Krishna Mangipudi, Nashua, NH (US); Vijay Basani, Nashua, NH (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/451,592

(22) Filed: Nov. 30, 1999

Related U.S. Application Data (60) Provisional application No. 60/110,350, filed on Dec. 1, 1998.

(51) Int. Cl.
  *G06F 15/173* (2006.01)
(52) U.S. Cl. .................. 709/223; 709/200; 709/203; 709/224; 709/225; 709/226; 709/232; 709/235; 370/270; 370/235; 370/252; 370/253; 370/254
(58) Field of Classification Search ............... 709/223, 709/224, 225–226, 232, 235, 200–203; 370/270, 370/235, 252–254
  See application file for complete search history.

(56) References Cited

U.S. PATENT DOCUMENTS

| | | | |
|---|---|---|---|
| 5,893,905 A | | 4/1999 | Main et al. ............ 705/11 |
| 5,951,694 A | * | 9/1999 | Choquier et al. ............ 714/15 |
| 6,021,263 A | * | 2/2000 | Kujoory et al. ............ 709/232 |
| 6,058,102 A | * | 5/2000 | Drysdale et al. ............ 370/248 |
| 6,073,175 A | * | 6/2000 | Tavs et al. ............ 709/226 |
| 6,175,832 B1 | * | 1/2001 | Luzzi et al. ............ 707/10 |
| 6,269,401 B1 | * | 7/2001 | Fletcher et al. ............ 709/224 |
| 6,304,892 B1 | * | 10/2001 | Bhoj et al. ............ 709/202 |
| 6,321,263 B1 | * | 11/2001 | Luzzi et al. ............ 702/186 |
| 6,363,477 B1 | * | 3/2002 | Fletcher et al. ............ 709/223 |

(Continued)

FOREIGN PATENT DOCUMENTS

| | | | |
|---|---|---|---|
| WO | WO 09842102 A | * | 9/1998 |

OTHER PUBLICATIONS

Measuring service in Multi-Class networks, Dept. of Eletrical and Computer Egineering Rice University, Aleksandar Kuzmanov and Edward W. Knightly.*

(Continued)

*Primary Examiner*—Saleh Najjar
*Assistant Examiner*—ThuHa Nguyen
(74) *Attorney, Agent, or Firm*—Brian L. Michaelis; Joseph P. Quinn; Brown Rudnick Berlack Israels LLP (57) ABSTRACT

A method and apparatus is provided for generating, collecting, and manipulating useful information for validating or defining SLAs of web servers on a network. Web servers comprising a web farm on the network are adapted for logging detailed runtime information regarding user transactions and performance parameters. An Accumulator device interacts with intelligent agents to collect and combine their log files, process the combined file and post information into a database. An operator enters committed performance parameters into an SLA Reporter system according to classes of users, classes of web sites being hosted on the web servers, classes of URLs, transaction, content and file type. When compared with the database, processing of SLA reports indicate how well the parameters of the SLAs are being met for users, web sites, classes, URL's and transactions, or other measurable elements. By generating, collecting, combining and processing in this manner, application-specific performance can be quickly and automatically evaluated with respect to parameters related to user satisfaction and detailed signals can be issued for cases in which remedial steps should be undertaken.

22 Claims, 8 Drawing Sheets

U.S. PATENT DOCUMENTS

| | | | |
|---|---|---|---|
| 6,453,468 B1 * | 9/2002 | D'Souza | 717/168 |
| 6,459,682 B1 * | 10/2002 | Ellesson et al. | 370/235 |
| 6,577,628 B1 * | 6/2003 | Hejza | 370/392 |
| 6,728,748 B1 * | 4/2004 | Mangipudi et al. | 718/105 |
| 6,816,907 B1 * | 11/2004 | Mei et al. | 709/229 |
| 6,842,783 B1 * | 1/2005 | Boivie et al. | 709/225 |

OTHER PUBLICATIONS

Bandwidth provisioning and pricing fornetwokr with multiple classes of services, Wake Forest University and N.C. State University, Errin W. Fulp and Douglas S. Reeves.*

Mapping distributed application SLA to netowork QoS parameters, Bao Hua Liu, Pradeep Ray and Sanjay Jha.*

Danny Raz et al. "Optimal Partition of QoS Requirements with Discrete Cost Functions" IEEE Journal, vol. 12, Dec. 2000.*

Md M Akbar et al. "Optimal Admision Controllers for Sevice Level Agreement in Enterprise Networks", Department of CS and ECE, University of Victoria, Canada.*

Web document, "HP WebQoS White Paper", web site: www.internetsolutions.enterprise.hp.com/webqos/products/wp.html, picked as of Nov. 18, 1999, 8 pages.

Web document, "HP WebQoS Overview", web site: www.internetsolutions.enterprise.hp.com/webqos/products/overview/index.html, picked as of Nov. 18, 1999, 2 pages.

Web document, "HP WebQoS", web site: www.internetsolutions.enterprise.hp.com/webqos/, picked as of Nov. 18, 1999, 1 page.

Web document, "Opportunity Analyzer—How It Works", web site: www.hardingmarketing.com/clients/hp/webqosanalyzer/how_it_works.html, picked as of Nov. 18, 1999, one page.

Web document, "Opportunity Analyzer—Overhead Costs", web site: www.hardingmarketing.com/clients/hp/webqosanalyzer/analyzer/cost.html, picked as of Nov. 18, 1999, one page.

Web document, "Opportunity Analyzer—Revenue Generation", web site: www.hardingmarketing.com/clients/hp/webqosanalyzer/analyzer/revenue.html, picked as of Nov. 18, 1999, one page.

Web document, "HP WebQoS Opportunity Analyzer", web site: www.hardingmarketing.com/clients/hp/webqosanalyzer/analyzer/, picked as of Nov. 18, 1999, one page.

Web document, "Overview—HP WebQoS Product Family", web site: www.internetsolutions.enterprise.hp.com/webqos/products/overview/products.html, picked as of Nov. 18, 1999, 2 pages.

Web document, "Next-Generation Service-Level Agreements Are Here", web site: www.candle.com/news/headlines/company/features/1999/pr-comp-20-110299/html, picked as of Nov. 22, 1999, 4 pages.

Web document, White Papers written by NetReference, Inc., Published Mar. 1997, "Service Level Agreements", web site: www.netreference.com/PublishedArchive/WhitePapers/SLA_wp/SLA_white_paper.html, picked as of Nov. 22, 1999, 10 pages.

* cited by examiner

URL Based SLA Query

| | Page Name | Requests | Visits | Subscribed Avg.RT (Sec) | Actual Avg. RT (Sec) | % Deviation | Subscribed Error Rate | Actual Error Rate | % Deviation |
|---|---|---|---|---|---|---|---|---|---|
| 1 | Webmanage HomePage /homepage.html | 62 | 33 | 5 | 5 | 0 | 3 | 1 | 33.3 |
| 2 | Default Page /index.html | 36 | 19 | 5 | 8 | -60 | 3 | 3 | 0 |
| 3 | Product Details of Webmanage /products/products.html | 12 | 6 | 5 | 6 | -20 | 3 | 2 | +33.3 |
| 4 | About Webmanage /company/aboutus.html | 4 | 2 | 5 | 7 | -40 | 3 | 0 | +100 |
| 5 | Main page /main.html | 4 | 2 | 5 | 3 | +40 | 8 | 0 | +100 |
| 6 | Enroll for Product Evaluation!! /products/evaluation.html | 4 | 2 | 5 | 4 | +20 | 3 | 2 | +33.3 |
| | Total | 92 | 64 | | | | | | |

FIG. 5A

Back-end Virtual Site Based SLA

| | Virtual Site Name/IP | Subscribed Avg.RT (Sec) | Actual Avg. RT (Sec) | % Deviation | Subscribed Error Rate | Actual Error Rate | % Deviation |
|---|---|---|---|---|---|---|---|
| 1 | Ws1.bu.edu | 5 | 1 | +80 | 3 | 2 | +33.3 |
| 2 | Ws1.wmt.edu | 5 | 1 | +80 | 3 | 2 | +33.3 |
| 3 | Ws2.bu.edu | 5 | 3 | +40 | 3 | 0 | +100 |
| 4 | Ws2.wmt.com | 5 | 4 | +20 | 3 | 1 | +60 |

FIG. 5B

Back-end Server Based SLA

| | Server Name/IP | Class | Subscribed Avg.RT (Sec) | Actual Avg. RT (Sec) | % Deviation | Subscribed Error Rate | Actual Error Rate | % Deviation |
|---|---|---|---|---|---|---|---|---|
| 1 | Server1 | Platinum | 5 | 1 | +80 | 3 | 2 | +33.3 |
| 2 | Server2 | Platinum | 5 | 8 | -60 | 6 | 10 | -66.6 |

FIG. 5C

Total Bandwidth

| | Bandwidth Subscribed (KB) | Actual Bandwidth (KB) | % Deviation |
|---|---|---|---|
| 1 | 9000 | 7900 | +12.2 |

FIG. 5D

Bandwidth Utilized by each Backend Server

| | Virtual SiteName/IP | Backend Web Server | Bandwidth (KB) |
|---|---|---|---|
| 1 | Ws1.wmt.com | Server1 | 1200 |
| 2 | Ws1.bu.edu | Server1 | 2300 |
| 3 | Ws2.wmt.com | Server2 | 3400 |
| 4 | Ws2.bu.edu | Server2 | 1000 |
| | Total | | 7900 |

FIG. 5E

Class Based SLA

| Class | Subscribed Avg.RT (Sec) | Actual Avg. RT (Sec) | % Deviation | Subscribed Error Rate | Actual Error Rate | % Deviation |
|---|---|---|---|---|---|---|
| 1 Platinum | 5 | 3 | +40 | 3 | 0 | +100 |
| 2 Gold | 5 | 4 | +20 | 3 | 4 | -20 |
| 3 Silver | 5 | 5 | 0 | 3 | 2 | +33.3 |

FIG. 5F

User Based SLA Query

| User Name/IP | Class | Subscribed Avg.RT (Sec) | Actual Avg. RT (Sec) | % Deviation | Subscribed Error Rate | Actual Error Rate | % Deviation |
|---|---|---|---|---|---|---|---|
| 1 IBM | Gold | 5 | 2 | +60 | 3 | 1 | +66.6 |
| 2 Microsoft | Gold | 5 | 6 | -20 | 6 | 3 | +50 |
| 3 INTEL | Platinum | 9 | 5 | +44.4 | 8 | 5 | +37.5 |

FIG. 5G

METHOD AND APPARATUS FOR IMPLEMENTING A SERVICE-LEVEL AGREEMENT

RELATED APPLICATION

Priority is claimed to U.S. Provisional Patent Application Ser. No. 60/110,350, entitled A SOFTWARE SYSTEM THAT PROVIDES A MECHANISM TO PROVISION, ASSIGN, MEASURE & AUDIT SERVICES OFFERED TO INTERNET/INTRANET SITE USERS, AND GENERATE QUANTIFIABLE REPORTS-SERVICE LEVEL AGREEMENTS (SLA) AND SLA REPORTING, filed Dec. 1, 1998, which is incorporated herein by reference.

FIELD OF THE INVENTION

The present invention pertains to network communications, particularly for establishing, measuring, and reporting service attributes.

BACKGROUND OF THE INVENTION

The rate of flow of data in computer networks between hosts and clients in Internets and Intranets depends upon many parameters. Some of these parameters can be tied to the provision of resources. These provisioned resources can be measured and audit reports can be generated to see if the parameters are in the range of negotiated Service Level Agreements. A Service Level Agreement (SLA) between a service-provider and a user defines the expected and acceptable properties of the services, typically in the context of providing Internet services. The SLA provides a tool by which performance goals can be measured, by defining the performance metrics and the corresponding goals. By monitoring compliance with SLA limits, a service provider can avoid the costly problems that result from disappointing users or hosted customers.

Network operations can be monitored and measured using standard techniques such as Route Monitor (RMON) and its probes to gain insight into the flow rates of data between points within these monitored networks. These measurements stop short of the application layer in the OSI model. Application layer parameters such as throughput, latency and round trip time are not covered in these measurements. Other factors that influence the round trip time at the application layer are local conditions such as CPU availability (processing overload), and secondary resource availability (e.g., database access). Furthermore, the known network monitors do not monitor the number of concurrent network connections that can be opened on each server. A web site on the Internet or Intranet may contain numerous, diverse servers, each with its own CPU, databases, and network connections. Thus, network layer measurements only shed partial light on the performance of a web site.

It is known that a SLA can be defined to guarantee the flow rates in networks and these SLAs can be honored in switched networks using such protocols as Reservation Protocol (RSVP) or in the ATM fabric at a rather coarse granular level. Network bandwidth is then assigned to the flows based on the SLA parameters. This SLA-based assignment guarantees the requested bandwidth from the client to the web server and back. However, it stops short of measuring the traffic flow up to the application layer at the web server that provides the service. In the context of the application layer (OSI layer 7) in the HyperText Transfer Protocol (HTTP)—as it pertains to the flows in the Internet—there are several parameters that can be provisioned (i.e., installed and activated) and then measured and audited. In order to guarantee end-to-end SLA these parameters have to be taken into account by the monitoring system.

It is known by those skilled in the art that individual host computers can create logs of each client request. These log files are stored, usually in ASCII format on disk in the host computers. The log files contain "raw," unformatted information about each transaction or client request, and may be provided in diverse, incompatible formats. Further, as mentioned above, these log files contain only a part of the information necessary to generate reports about SLAs.

Within a cluster of web servers there is often an autonomous sharing of resources to service an external request more efficiently. Simple network performance monitoring reports or host performance monitoring reports do not collect and correlate information in ways that can assist in evaluating and targeting network elements that may cause violations of an SLA. Even if host performance and network performance reports are combined, existing tools do not provide a way to filter out reports of problems that are automatically handled by other systems (e.g., automatic retry). One major disadvantage of the prior art is the inability to monitor and characterize real-time request streams and their corresponding responses. Another disadvantage is the inability to match the measured parameters with each independent SLA in a manner that provides user-oriented reporting. Yet another disadvantage is that existing reporting mechanisms are necessarily tied to particular machines, even though a user transaction may be serviced by any of several different machines. Similarly, reporting on the performance related to some particular web content (e.g., a web site) is difficult when the same content can be served by any one of several different machines.

One example of a known SLA implementation is disclosed in U.S. Pat. No. 5,893,905, issued Apr. 13, 1999. In that system, as applied to a scheduled computer processing job environment, a monitoring center automatically retrieves job exception data (logs), job run data, and clocktime data from multiple computer systems, each of which is running a collection and retrieval program module. The retrieved data is stored in appropriate databases for each type of data collected. A jobflow table, according to the daily SLAs, is also stored in the system, corresponding to a set of tasks to be performed. A "periodic data analysis process" determines whether jobs are timely run, or if errors have occurred. If tardy jobs or errors are detected, the system determines whether the result will negatively affect the SLA. If a problem is detected, then operators are signaled with reports designating jobs that may impact an SLA, and which SLA is in jeopardy, so that operations personnel can take additional manual steps.

One major disadvantage of the disclosed system is the reliance upon pre-defined SLA jobflow tables for determining which jobs should be run at a given time on a given day. The jobflow tables presume a static jobflow. The tables also presume a predictable timing, either for a job, or for a given series of jobs necessary to comply with an SLA. Furthermore, the disclosed system provides an alert only if a job error has occurred or if estimated time to complete a job exceeds the limits of the corresponding SLA. The only information obtained is that the schedule of a downstream job may be affected. These limited signals cannot be easily correlated with the wide variety of metrics that can have real-time affect upon users. A static job table cannot be applied in the environment of a real-time web-sever where there is no standardized sequence of jobs, and "time of day"

sequencing is irrelevant. Nor can this type of limited output signaling be used to determine whether a problem is temporary or persistent. Also, the limited output of the prior art system does not accommodate reporting on multiple "back-end" servers that can share the role of servicing real-time requests; rather, it simply reports a "violation." The same report would be issued even if the job were re-run on another production server.

SUMMARY OF THE INVENTION

The present invention provides a method and apparatus for generating, collecting, and manipulating useful information for validating or defining SLAs of web servers on a network. Web servers comprising a web farm on the network are adapted for logging detailed runtime information regarding user transactions and performance parameters.

According to the invention, an Accumulator device on the network interacts with an intelligent agent on each web server to collect and combine their log files, process the combined file and post information into a database. An operator enters committed performance parameters into an SLA Reporter system according to classes of users, URLs, transactions, content or file type, or classes of web sites being hosted on the web servers. When compared with the actual data from the database, processing of SLA reports indicate how well the parameters of the SLAs are being met for users, virtual sites, classes, URL's and transactions, or other measurable elements. By generating, collecting, combining and processing in this manner, application-specific performance can be quickly and automatically evaluated with respect to parameters related to user satisfaction and detailed signals can be issued for cases in which remedial steps should be undertaken.

In further accord with the present invention, a network model includes a plurality of computer systems clustered into a web farm, in which a front-end system distributes service requests to one or more back-end web servers. The front-end system receives a service request from a user outside the web farm, selects one of the back-end servers to service the request, and forwards (routes) the request to the selected back-end server. Each back-end server then services the user request, and generates any necessary response directly to the requesting user. A given back-end server may be requested to process transactions destined for any of a number of "virtual sites" that the back-end server is hosting as a surrogate for the "hosted site" addressed in the transaction.

Each back-end server generates its own time-stamped log entry for each transaction it processes, resulting in a distributed log file in the network. The individual files of the distributed log file each include information regarding username, date, time, service, server name, server IP address, client IP address, processing time, bytes sent, bytes received, service status, operation, target URL, User Agent, referrer parameters, Smserver, Smvirtual site, and cookie. Log files collected in the web farm also include a time stamp to measure the web-farm transfer time, the front end server's name, and the DNS name of the host that serves the request. This extensive combination of information has the advantage of containing the specific details necessary for building a meaningful SLA report. A further advantage is realized by including user, server, URL, and other labels in the log files such that transactions can be traced from one place in the web farm to another, and the corresponding performance elements aggregated. Similarly, detailed logfile labeling facilitates later correlation of reports along any logged parameter, such as according to the URL.

An Accumulator process working in conjunction with the intelligent agents on the servers periodically collects the most recent entries of each distributed log file. According to the invention, a periodic event triggers the collection process whereby each back-end server on a list of servers is contacted and a log file update is requested from each server. An agent on each back-end server that is contacted then determines which recent log information should be transferred to the Accumulator, opens a network transfer connection to the Accumulator, and sends the requested log file update. The Accumulator waits until it has received log file updates from each listed agent and then combines the collected log files into a consolidated log file for the listed back-end servers. The Accumulator may perform the same collection operation for different sets of servers and combine the log files into different consolidated log files for each set of servers. The combined log files are then parsed and the information is deposited into an SLA database.

An SLA report generator, according to the invention, is configured with the service parameters corresponding to each SLA of a user, or a class of users, a hosted site, or a class of hosted sites or classes of URLs, transactions, or content or file type. By accessing the SLA database, built from information obtained in the combined logs, the SLA report generator can compare the service parameters of each SLA with the actual service delivered, according to the information captured in the distributed log files of the back-end servers.

Some of the advantages of the invention include the following. There is no pre-defined job schedule necessary for comparing performance. Any transaction can be routed to any back-end server without having to adjusts the SLA service parameters. Many different kinds of transactions can be handled rather than having to obtain specific job-completion schedules. Unlike the prior art, a system adapted according to the invention provides performance information about not only the individual server processing requests, but also information about the specific machine selected to perform the service, and each major delay element encountered by a transaction. Furthermore, it provides detailed information about the specific "virtual host" to which the request pertained. It also allows for measurement of SLA metrics based on URLs, transactions, or content or file type, Another advantage of the invention is that different classes of users, classes of transactions or URLs, or hosted sites are defined, allowing reports to be prepared on a per-class basis rather than on simply a customer or job basis. Furthermore, a back-end server can be dynamically reconfigured to serve as a virtual host of another class and yet have its log file entries collected and processed properly for each listed class during the proper time.

BRIEF DESCRIPTION OF THE DRAWINGS

These and other features of the present invention will be better understood in view of the following detailed description taken in conjunction with the drawings, in which.

DETAILED DESCRIPTION OF THE INVENTION

Figure 1:
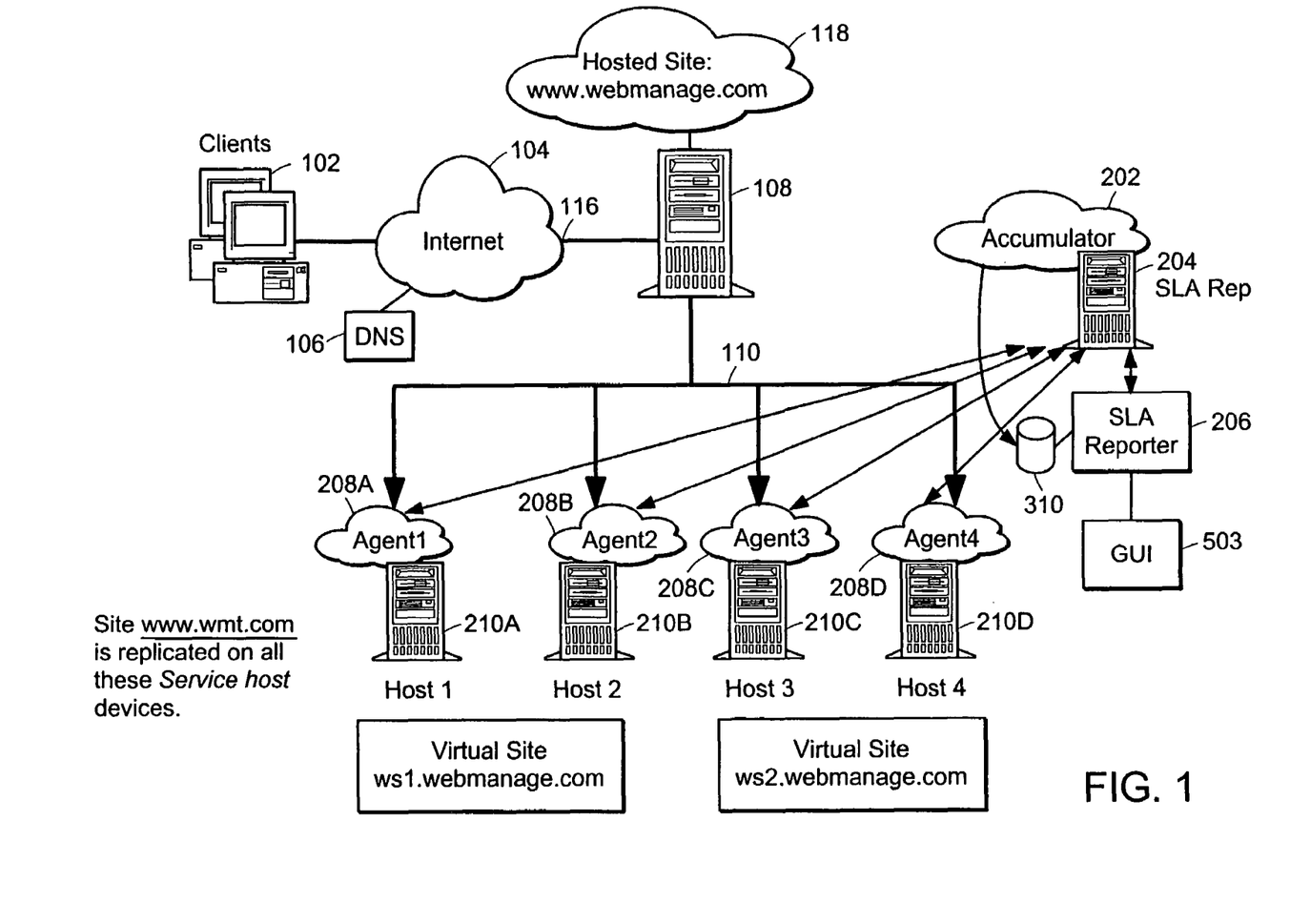
FIG. 1 is a functional block diagram of a network system that implements an embodiment of the invention.

Networks of computer systems have evolved to include those computers and networks that operate under the defacto standards of the Internet Protocols (IP). A so-called "web browser" in a client computer 102 permits computer users to access the internet 104 and all of the compatible web sites, as shown in FIG. 1. A user typically enters the name of a web site 118 (the domain name) into the web browser on the user's (client) computer 102. The web browser then uses the Internet services to query a Domain Name Server 106 to locate the address of a web server which hosts the web site, and to receive an Internet address for the web server. The user's web browser then uses the Internet services to contact the web server 108 at the designated Internet address with transactions for the web site 118.

The web site 118 may be hosted on a web server that is available on a single computer that will respond to the transaction itself (e.g., a request, or information), or it may be a distributed system of multiple computers, such as a "web farm" comprised of a front-end sever 108 and multiple back-end servers 210. Multiple back-end servers are typically connected to a local area network (LAN) 110 (or across a wide-area network) which is also connected to the front-end server 108. The use of multiple computers is indicated for reasons such as load balancing, increased availability, security, or other policy/service considerations. However, a typical user is not concerned with the details of where or how the web server 108 handles the web browser interactions with the web site 118, except when performance or availability affect the user directly.

The subscribers of a web server service include information creators (web-site content providers) and others who desire to offer web services to users (e.g. "e-tailers," or merchants, customer service organizations, corporate organizations, as well as the web-site-hosting customers of an ISP, etc). The subscribers can be enticed to enter contracts for services with web server operators by negotiation of a Service-Level Agreement (SLA). An SLA defines the operational parameters of the web server that the operators will monitor, and the relative acceptability of the server services for each parameter. For example, a subscriber may demand a performance objective in which a specified bandwidth (e.g., octets of data per minute), or response time or error rate must be sustained by the server. The operators also need to capture data regarding the actual usage of the server (e.g., for billing purposes), while also predicting the need for additional resources. Failure to adequately provision a web server with the necessary resources (disk drives, processors, communication links, etc) can leave an operator in violation of some parameters of an SLA. On the other hand, a web server that exceeds the provisions of the SLA can also result in rewards for the server-site operator.

In FIG. 1 the system that goes by the DNS (web site) name www.webmanage.com is the front-end system 108. "Hosted Sites" are the published domain names which have an IP address 116 of the front-end server 108. By definition, hosted sites do not serve content; however, they forward transactions to the back-end servers 210 in the web farm. "Virtual Sites" are the sites hosted on the back-end web Servers. In FIG. 1, Ws1.webmanage.com and Ws2.webmanage.com are virtual sites. Virtual Sites are tied to web servers and are responsible for generating responses to user transaction requests. For every hosted site there has to be at least one Virtual Site. Multiple hosted sites may be hosted on the same server and thus have the same IP or Internet address 116. Requests for any of the multiple hosted sites may therefore arrive at the same front end server 108 for multiple hosted sites.

In an embodiment of the present invention, the front end server 108 receives a user's transaction information, such as a request to download particular information from the hosted site 118 located at a particular Internet address 116. The web farm management can choose which back-end web server 210A, 210B, 210C, 210D to use for each hosted web site, and can change servers as a function of load-balancing techniques among the front end server 108 and the back end servers 210. Since the web server may be hosting multiple hosted sites, it must respond to transactions for each hosted site.

In a web farm configuration, the Service-Level Agreement may depend upon the performance of numerous elements of a server site at the Internet address 116, including the front end server 108, the LAN 110, and each back end server 210A, 210B, 210C, 201D that hosts a virtual site. Therefore, performance and operation of these elements are measured, correlated and reported. Each server 210 keeps a log file of its own activities, including time-stamped records of performance, transactions, and errors. The log file format is generated using modified IIS Server Application Program Interface (ISAPI) filters on Microsoft® Internet Information Server (IIS), or Netscape® Server Application Program Interface (NSAPI) plug-ins on Netscape servers, or extensions for Apache™ servers. A typical log file contains the additional information pertaining to the client IP address, username, date, time, service, server name, server IP address, processing time, bytes sent, bytes received, service status, operation, target URL, User Agent, referrer parameters, SMserver, Smvirtual site, and cookie. Log files created on each server in the web farm also include a time stamp to measure the transfer time, the routing host's name, and the DNS name of the host that serves the request.

In addition, log files can be further extended to include information necessary to report on SLAs that include metrics based upon the additional parameters including the following: the assigned disk space; what the user can access; how the user's request is fulfilled within the system or web farm; user's subscribed level of service or class; transaction; # of requests; download size; file size, file type etc.; time of day, week or month; response time of the back end servers or web farm; and/or how long it takes to complete a specified request or file.

Figure 2:
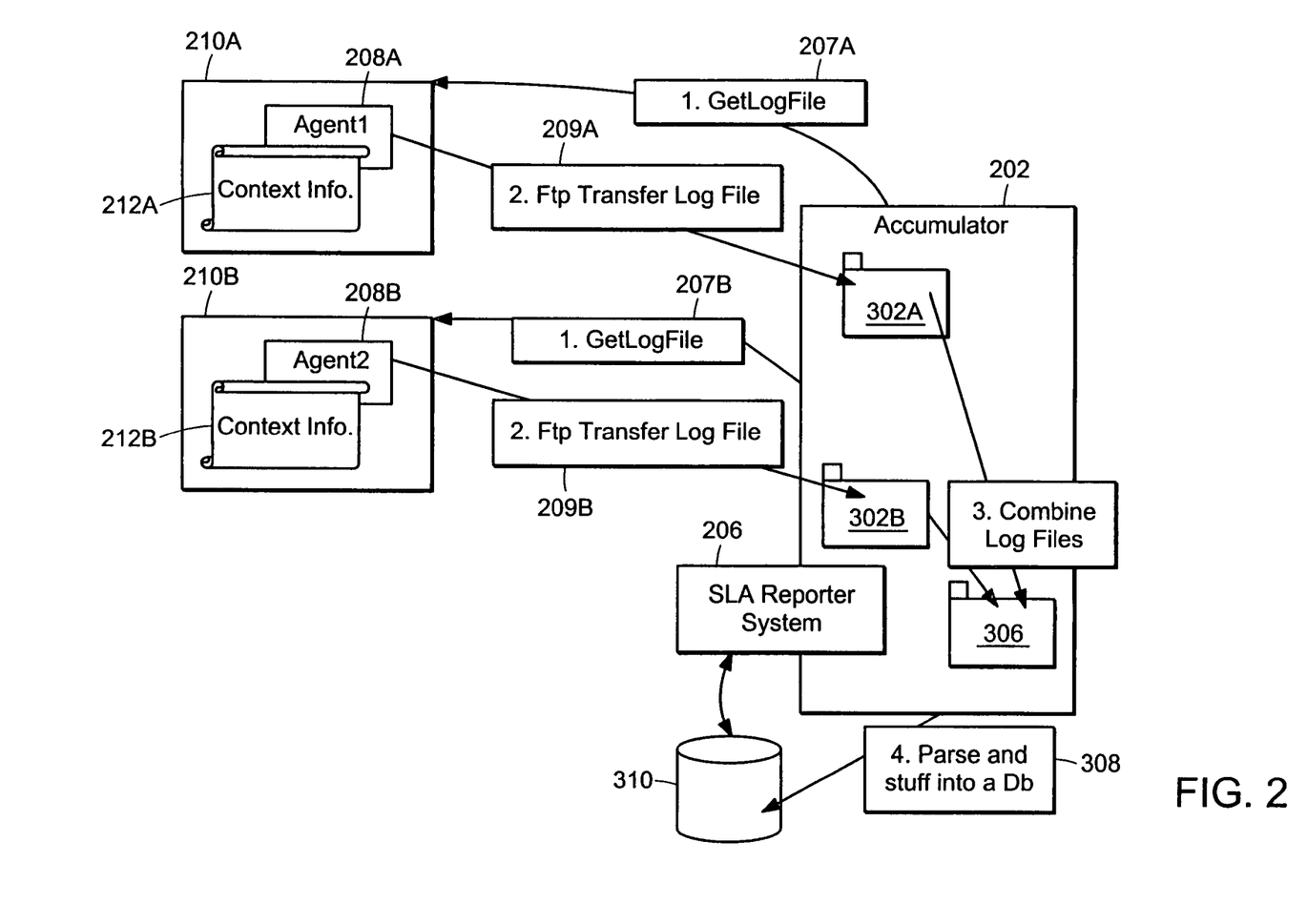
FIG. 2 illustrates the system architecture for accumulating reports from agents.

As a further illustration of an embodiment of the invention, FIG. 2 shows a block diagram of a reporting system. Agents 208 on the back-end servers collect and transfer log files from each server 210 to an Accumulator 202. The Accumulator 202 collects log files from the agents 208, combines them, and places the processed results into a database 310. An SLA Reporter System 206 can then query the database 310 to generate SLA reports, according the configuration arranged by an operator's configuration management GUI 503 (FIG. 1). The elements of the illustrative embodiment are now described in further detail.

At least one of the computers on the network of the web farm runs a process designated as the Accumulator 202 (See FIG. 2). The Accumulator 202 collects data from various back end web servers 210 and generates a file in an intermediate format. The semantics in this file support SLA reporting according to the invention. For example, the Accumulator runs as a NT Service on NT. Intelligent agents 208, implemented in software, are deployed on back-end web servers 210 and configured to work with the Accumulator 202. Based on a user configurable polling interval, the Accumulator 202 "wakes up" and contacts 207 the agents 208 on backend web servers 210. As a result of this, each agent opens its server log files, and transfers 209 the information over to the Accumulator 202.

As shown in FIG. 2, each agent 208 maintains a context 212 of when it was last contacted, which log file was transferred, and how many bytes of the log were transferred. The first time an agent is contacted by the Accumulator 202, the agent will create all the context information and transfer the entire log file. The next time around when the agent is contacted, and the same log file is requested, the agent will determine the difference from the data already transferred and will only transfer the "delta" from the previous transfer. The file transfer 209 from each agent 208 to the Accumulator 202 is made using any well known file transfer protocol, such as FTP over TCP/IP.

After all agents 208 in the backend servers finish their log file transfer 209, Accumulator 202 then combines the log files into a single file 306. The Accumulator 202 then invokes a log parser routine 308 to parse this combined log file 306, recognize the semantic types and upload them into a data repository 310. After the Accumulator 202 parses and updates the data repository 310, it will go back to sleep until the next timed update interval. Updates can also be triggered by selected events, such as trouble signals, or manual intervention.

Figure 3:
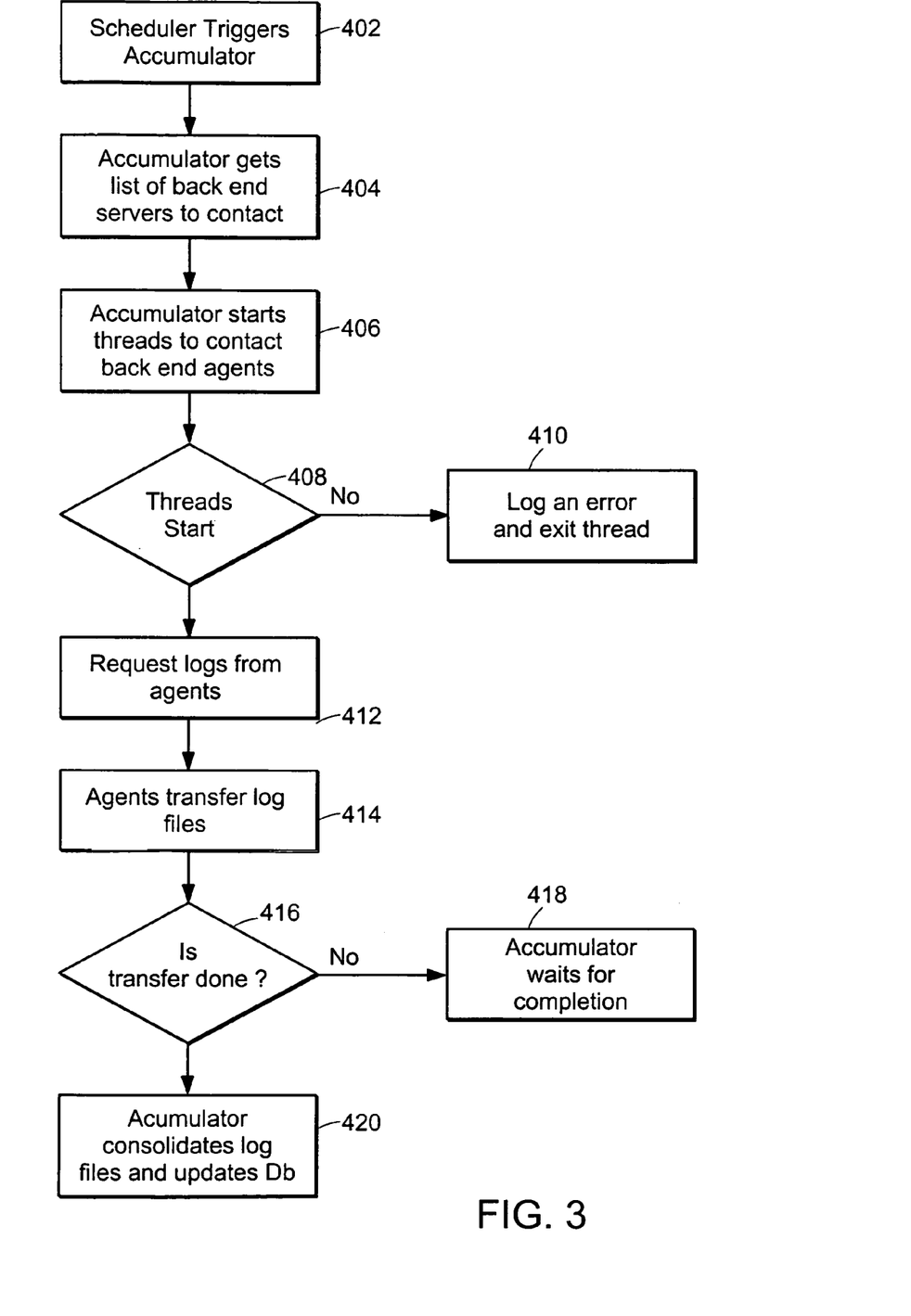
FIG. 3 illustrates an embodiment of a report Accumulator.

In the flow chart of FIG. 3, the processing of the Accumulator 202 is provided in greater detail. At step 402, a scheduler triggers the Accumulator to collect the log files 302 from the agents 208. At step 404 the Accumulator obtains a list of the servers 210 having agents 208 to contact. Steps 406 and 408 start an agent contact thread and test to see if the thread is started. If the thread is not started, then the decision at step 408 results in an error condition 410. Once a thread is started, step 412 requests the current log file from each listed agent. As described hereinbefore, each agent 208 maintains its own context file 212 to determine which information is sent to the Accumulator 202. At step 414 each listed agent 208 transfers its corresponding log file 302 to the Accumulator 202. The Accumulator process then waits for the completion of transfer of each log file at steps 416 and 418. When all listed agents have transferred their files 302, the Accumulator executes step 420 in which the log files are consolidated into a single file 306. Then the database (Db) 310 is updated.

Figure 4:
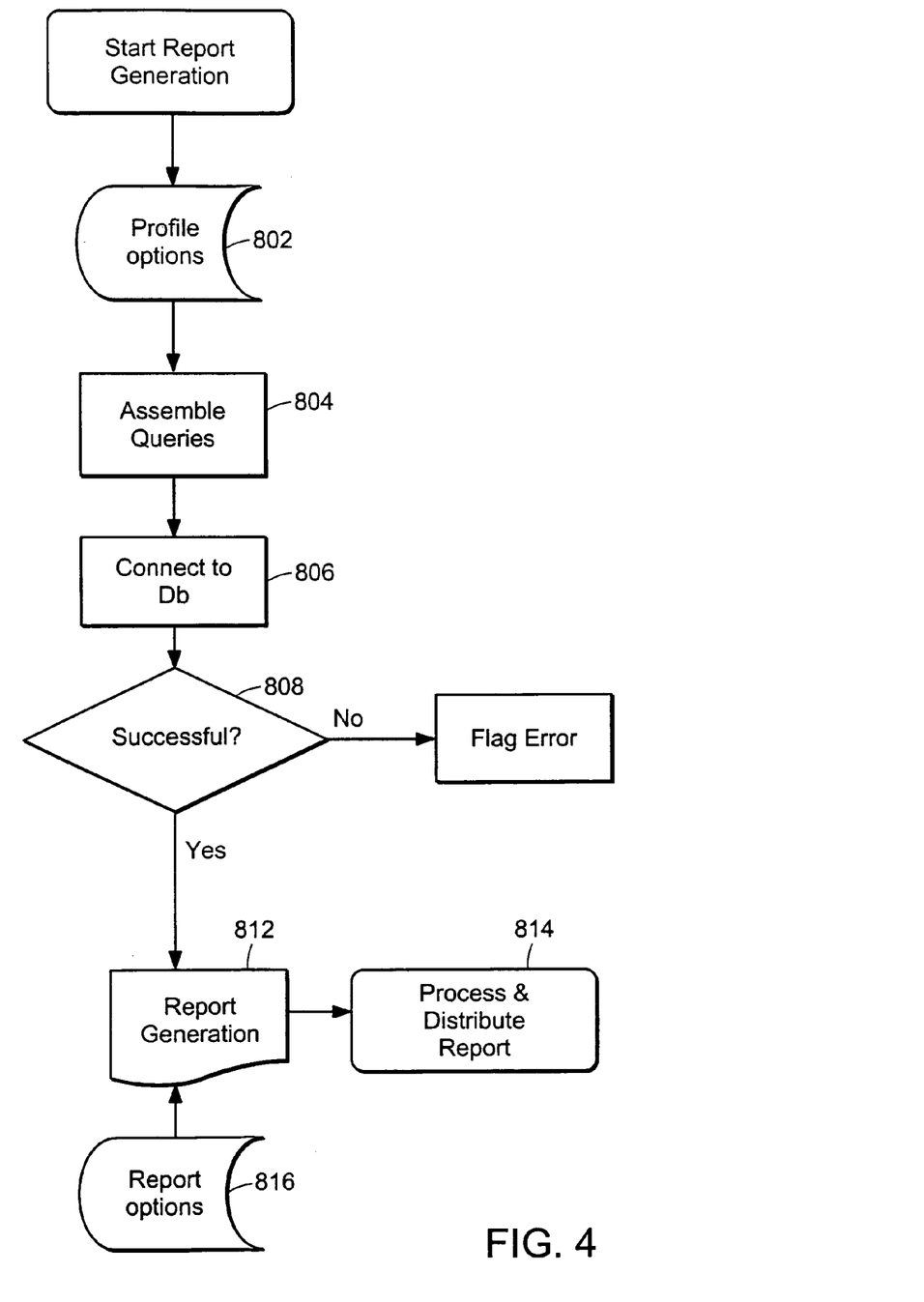
FIG. 4 illustrates an embodiment of an SLA report generator.

The database 310 provides the information necessary for responding to queries such as from an SLA reporter 502, illustrated in FIG. 4 The SLA Reporter 206 is a process which generates reports. The reporter initially accesses administratively defined SLA parameters or profiles 802. The reporter assembles queries 804 to get actual SLA parameters/measurements from the database. A connection 806 is made to the database. If successful 808, queries are run and the report is generated 812. The report is formatted and delivered 414 in accordance with user-specified options 816. The SLA Reporter will contain queries that will contrast the agreed SLA parameters against the actual measured service level. SLA metrics are provided per virtual site, URL, transaction, content type, file type, source IP, and user class. Within a virtual site, definitions for classes are also created. Each class implies certain agreed-to SLA metrics. For example, a "gold" class may be defined to require higher performance than a "silver" class. A hosted site is defined with no more than one class. Similarly, a User is defined with no more than one class. An operator defines the acceptance parameters of a class by entering the class name, and assigning servers to service that class. Servers may also be re-assigned by other web-farm entities as performance needs indicate. In addition, a class is defined by way of its subscribed error rate, response time, and bandwidth parameters. As an added feature, if a configuration operator attempts to delete a class definition from the database, the system will first check to see if the class is defined for any host, and will prevent deletion of assigned classes.

An SLA Configuration GUI 503 allows the operator to define SLA metrics. In effect, the SLA requirements are programmed into the report generator. The SLA reporter can be configured to provide information according to an Internet IP address (i.e., a "user"), or according to the hosted site name, URL, transaction, content types or file type. This permits reports for either type of SLA. An operator uses a configuration interface to add SLA parameters for any of the foregoing parameters to the database. A User configuration includes: user name, user IP address, subscribed response time, subscribed error rate, and subscribed bandwidth. A Host configuration includes: Host name and subscribed bandwidth. As an added feature, configuration parameters may also be imported in batch form from a file selected by the operator using a file browsing feature of the GUI. A URL configuration includes file name response time and error data. A transaction configuration includes a group of URLs, subscribed response time and subscribed error rate. A content type configuration includes type of content and subscribed error rate. A file type configuration includes type of files, subscribed error rate, and subscribed bandwidth.

The operator then specifies a "profile" of information to be included in an SLA report. There may be multiple profiles defined and independently named. The GUI permits creating, editing, copying and deleting profiles. Each profile may contain an indication of the database from which SLA reports are to be compiled, and the name of a hosted site to be reported. A home page and web server URL are also defined in the profile, in order to provide meaningful reports. Various filters can be defined and then used to include or exclude information from the SLA reports generated by the profile.

SLA reports are comprised of queries to the database. The queries are based upon specification of the URL, the back-end virtual site, the back-end server, the class, or the user. They may also be based upon the total bandwidth or the bandwidth used by each backend server. The operator defines a report based upon information supplied in response to the desired queries.

FIG. 5 illustrates a sample SLA report generated by an embodiment of the present invention. FIG. 5A shows a sample report of service-oriented information accumulated for a series of URLs. The service-oriented information in the sample includes: number of requests for the web page, visits, the subscribed and round-trip delay, the subscribed and actual error rate, and the percent deviation between each set of subscribed and actual results. Similarly, FIG. 5B illustrates a sample SLA report based on the name of a virtual site in a web farm. Similarly, FIG. 5C illustrates a sample SLA report based upon each name of a back-end server in the web farm. The service-oriented information is as described above. FIG. 5D illustrates a sample SLA report for bandwidth of the site, comparing the subscribed to the actual. FIG. 5E shows a sample SLA report for bandwidth utilized by each virtual site named in the web farm.

Figure 5A:
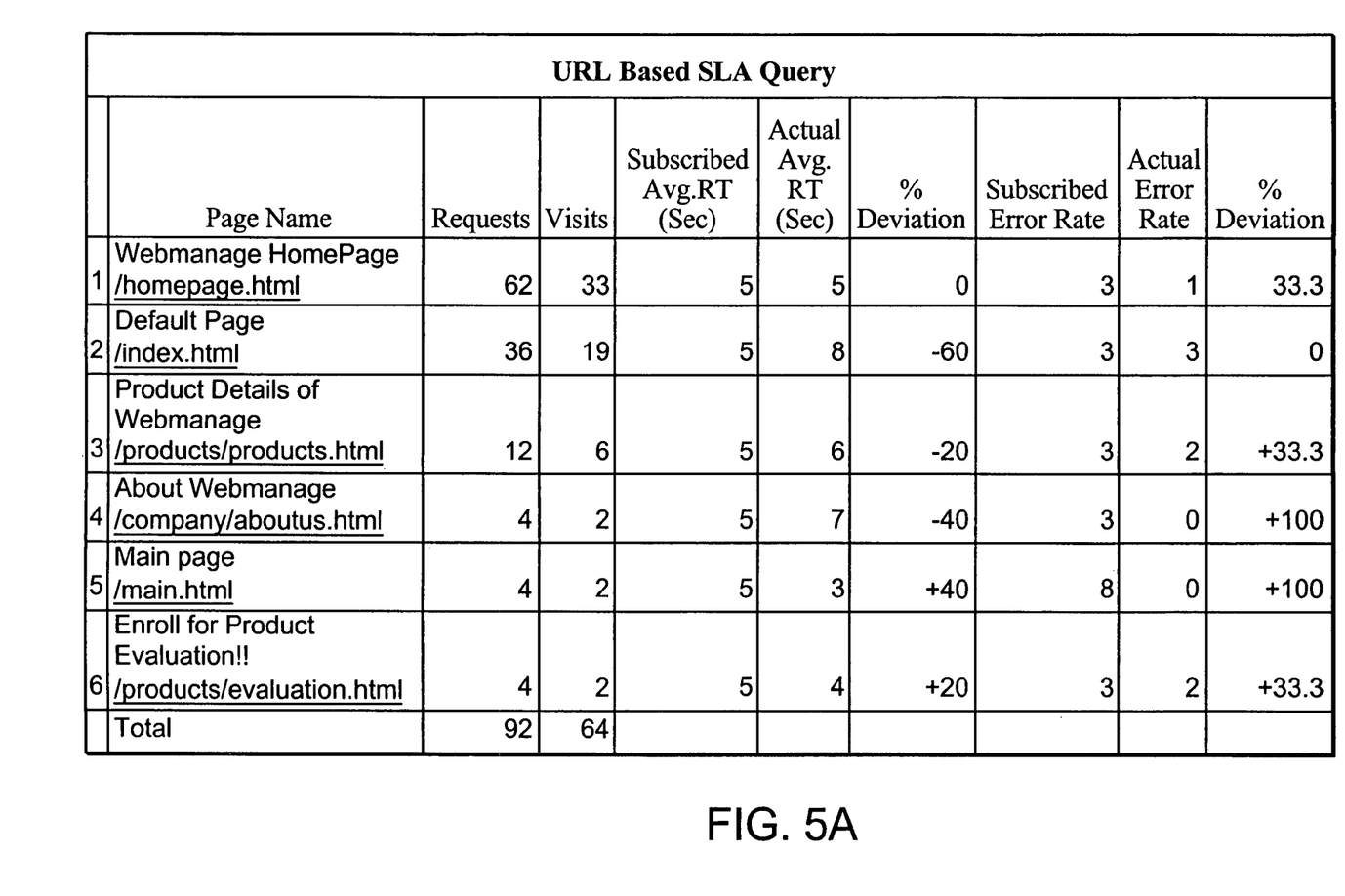
FIGS. 5a–5g are illustrations of SLA reports generated according to the invention.
Figure 5B:
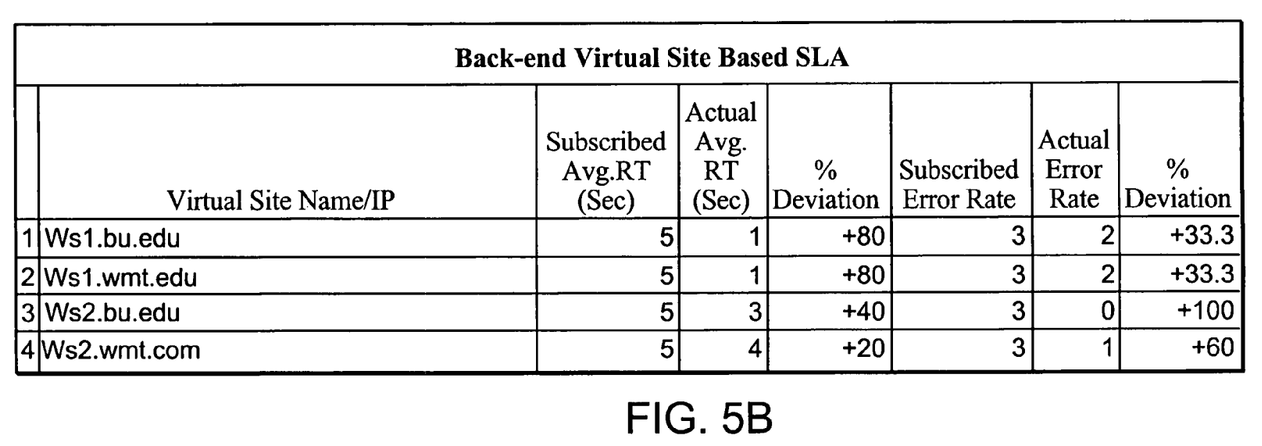
Figure 5C:
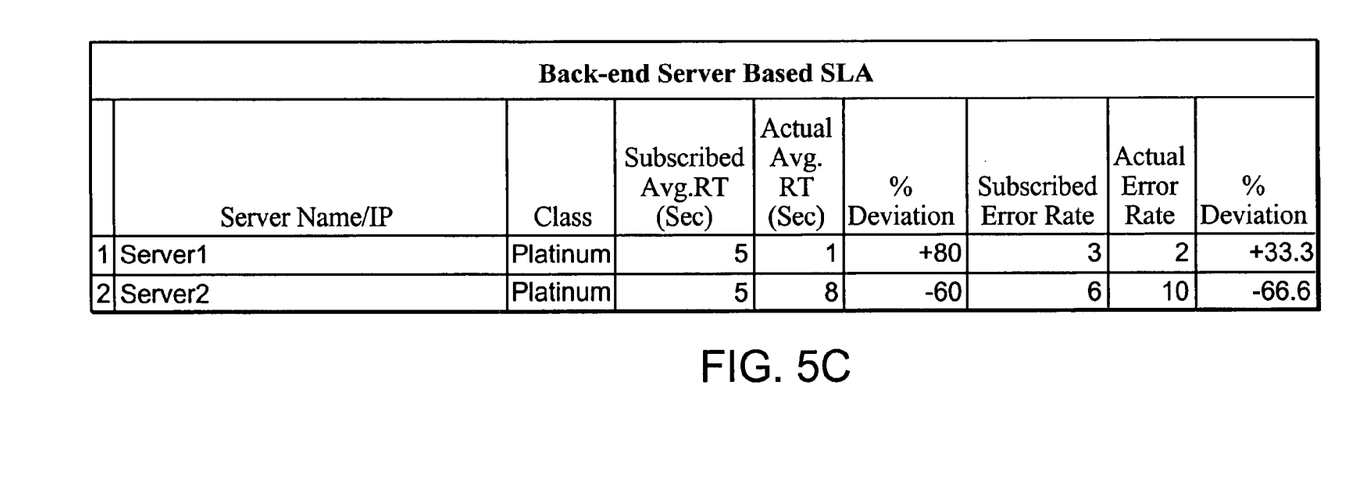
Figure 5D:
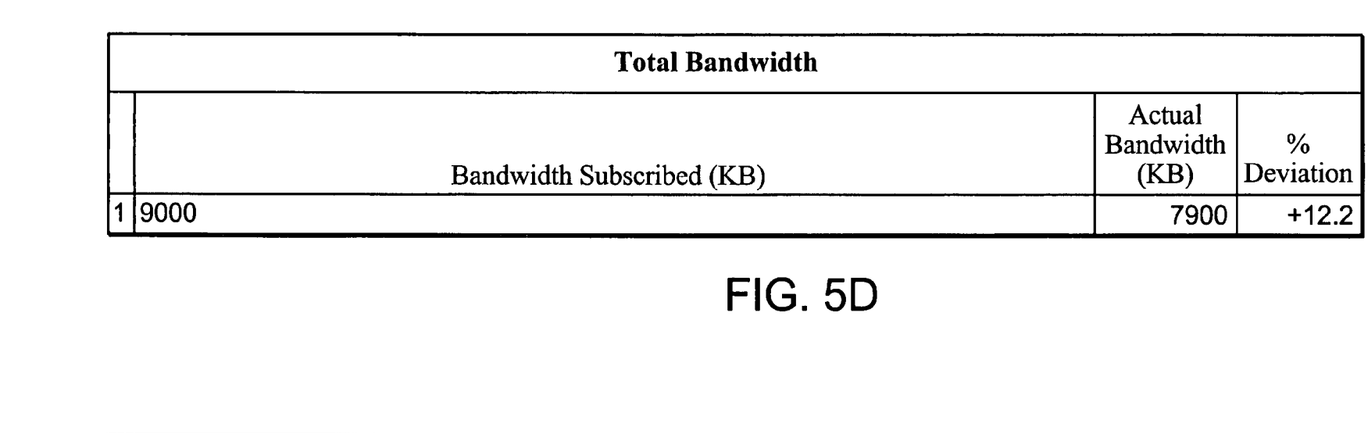
Figure 5E:
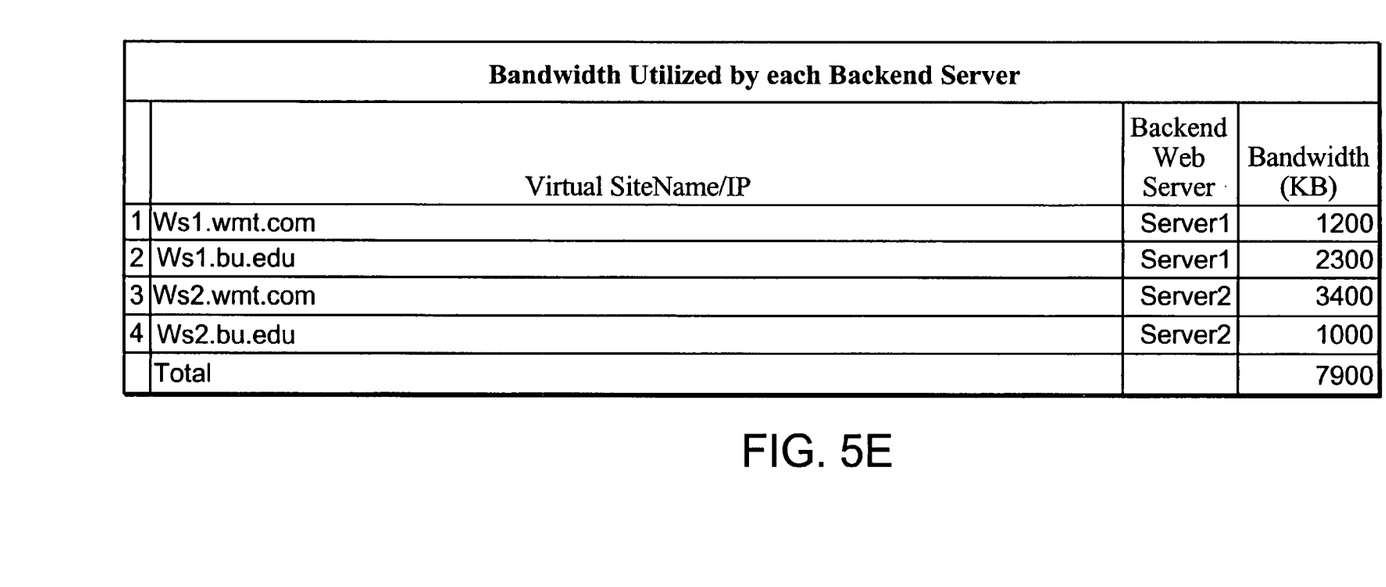
Figure 5F:
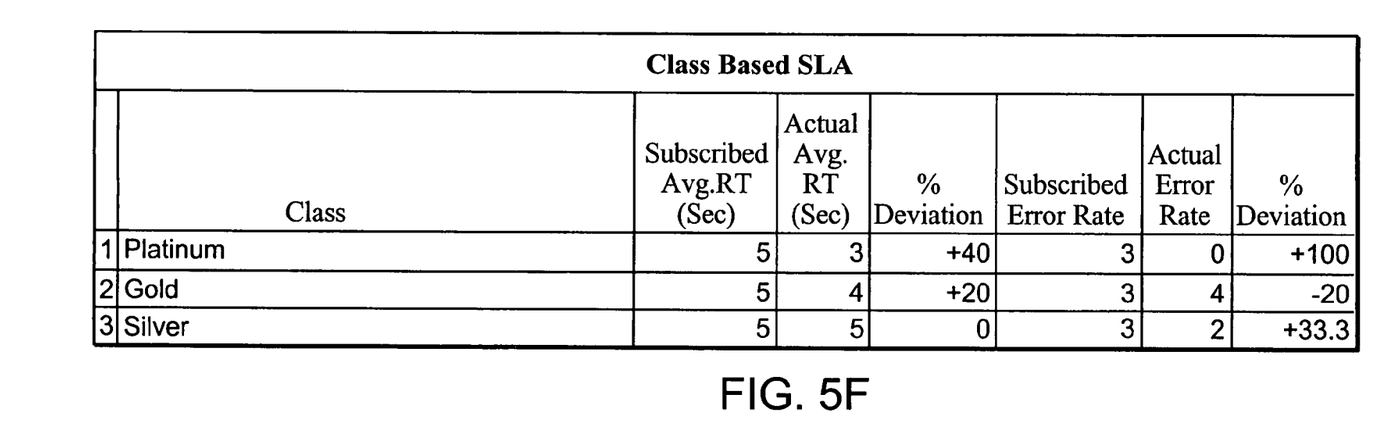

FIG. 5F illustrates a class-based SLA report, showing the selected performance parameters of several defined classes.

Figure 5G:
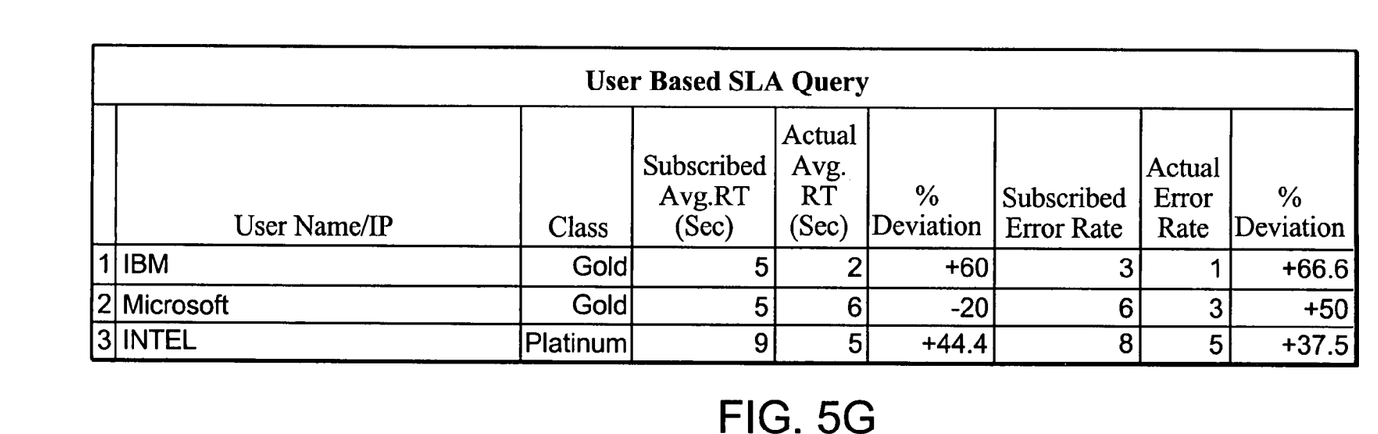

FIG. 5G shows a sample SLA report for a list of users, comparing the subscribed versus actual performance, and the percent deviation for each user.

It should be appreciated that various other permutations of information can be developed and presented in report form according to the invention.

Further, it should be appreciated that although the illustrative embodiment herein is described in the context of a Windows NT platform, other platforms could provide the basis for implementation of the functional components described herein, such as Solaris, Linux, other UNIX variations or the like.

Although the functionality described herein is particularly implemented and divided between the Accumulator and the back-end servers/agents, it should be appreciated that the functionality could be alternatively divided and implemented. For example, certain functionality on the Accumulator could be implemented on the servers and vice versa. Similarly, although the functionality is generally described implemented as software processes, it should be appreciated that such functionality can be alternatively implemented as hardware, firmware and/or any of various combinations of hardware, software, and firmware.

While particular sets of parameters, i.e. server attributes, are reported to the router in the implementation described herein, it should be appreciated that parameters other than those described could be reported as a function of the server information available, such as the types of files or size of files, or the like.

Although the invention is shown and described with respect to an illustrative embodiment thereof, it should be appreciated that the foregoing and various other changes, omissions, and additions in the form and detail thereof could be implemented without changing the underlying invention.

The invention claimed is:

1. A method for evaluating compliance with a service-level agreement, said method comprising the steps of:
   providing at least one back-end server connected to a network;
   defining service level classes of service as a function of agreed-to service level metrics;
   grouping at least one of host system, user, URL, hosted site, transaction, content and file type into respective service level classes of service;
   defining said service level metrics to be measured for each of said classes;
   defining acceptance levels for each class for each of said service level metrics;
   collecting information related to measurement of said service level metrics;
   comparing said acceptance levels to said information;
   deploying an intelligent agent on each of said back end servers;
   monitoring service level metrics using said intelligent agent and logging them into respective log files;
   collecting log files from said intelligent agents on a list of said back-end servers; and
   consolidating said log files collected from said list of back end servers in a database.

2. The method of claim 1 in which said step of defining further includes the steps of:
   providing a format in which a set of servers will provide information to be measured; and
   collecting said information.

3. The method of claim 1 in which said step of defining acceptance levels comprises the step of generating a database entry for each service commitment element of a service-level agreement.

4. The method of claim 1 in which the service level metrics are selected from the set consisting of: records of performance, and errors, client IP address, username, date, time, service, server name, server IP address, processing time, bytes sent, bytes received, service status, operation, target URL, User Agent, referrer parameters, SMserver, Smvirtual site, and cookie.

5. The method of claim 1 wherein the information collected further includes information selected from the group consisting of: assigned disk space, what the user can access, how the user's request is fulfilled within the system or web farm, user's subscribed level of service or class, transaction, number of requests, download size, file size, file type, time of day, week or month, response time of the back end servers, response time of the web farm, and how long it takes to complete a specified request or file.

6. The method of claim 1 in which said information related to measurement of said service level metrics is collected in real-time.

7. The method of claim 1 in wherein each of said host system, user, URL, hosted site, transaction, content and file type belong to no more than one class.

8. The method of claim 1 in which said step of defining service level classes of service comprises the steps of:
   identifying a set of agreed-to metrics; and
   associating said set of agreed-to metrics with one of a plurality of said service level classes of service.

9. The method of claim 1 wherein each of a plurality of said service level classes of service is defined by a set of agreed-to metrics.

10. The method of claim 1 wherein said service level classes of service define a hierarchy of service levels.

11. An apparatus for evaluating real-time compliance with a service-level agreement comprising:
    at least one back-end server;
    a network connecting said at least one back-end server;
    a collection processor measuring and periodically collecting a set of defined service level metrics for said at least one back-end server;
    a set of acceptance levels for said collected service level metrics wherein said set of acceptance levels define a service level class of service for at least one of host system, URL, hosted site, transaction, content, file type and user;
    a monitoring processor determining which of said collected service level metrics exceed a corresponding acceptance level;
    a reporting process that produces a report on a per-class basis of the results of said monitoring processor;
    an intelligent agent deployed on each of said back-end servers monitoring said service level metrics and logging them into respective log files;
    a scheduler triggering said reporter to begin collection of log files from a list of back-end servers;
    an accumulator requesting log files from the intelligent agent of each listed back-end server and consolidating the log files into a database; and
    an interface mechanism between said accumulator and each intelligent agent, said interface mechanism ensuring that each requested log file is completely transferred to the accumulator prior to starting consolidation.

12. The apparatus of claim 11 wherein each of said intelligent agents further keeps track of which portions of said log files have been transferred.

13. The apparatus of claim 11 wherein said service level class of service for at least one of host system, URL, hosted site, transaction, content, file type and user is defined by identifying a set of agreed-to metrics and associating said set of agreed-to metrics with one of a plurality of said service level classes of service.

14. A method for implementing management of a service level agreement monitoring system for a set of back-end servers in a web farm comprising the steps of:
providing at least one back-end server connected to a network;
defining a hierarchy of service level classes of service as a function of agreed-to service level metrics;
defining acceptance levels of said agreed to service level metrics for said service level classes;
selecting at least one class of service level metrics to be monitored;
creating a database of monitored service level metrics; and
preparing reports and/or alarms according to said selected class(s) of service level metrics;
deploying an intelligent agent on each of said back end servers;
monitoring service level metrics using said intelligent agent and logging them into respective log files;
collecting log files from said intelligent agents on a list of said back-end servers; and
consolidating said log files collected from said list of back end servers in said database.

15. The method of claim 14 further including the step of providing a graphical user interface for performing at least one of selecting the class of service level metrics to be monitored, defining thresholds of service-level commitments for at least some of said service level metrics, defining alarm trigger events, scheduling monitoring and reporting functions, and determining reporting formats.

16. The method of claim 15 wherein said step of preparing reports and/or alarms is further based on thresholds, schedules, and formats defined by the graphical user interface.

17. The method of claim 15 wherein the step of defining a hierarchy of service level classes is based on one of users, URLs and virtual sites.

18. The method of claim 14 in which said service level metrics to be monitored are selected from the set consisting of: records of performance, transactions, and errors, client IP address, username, date, time, service, server name, server IP address, processing time, bytes sent, bytes received, service status, operation, target URL, User Agent, referrer parameters, SMserver, Smvirtual site, and cookie.

19. The method of claim 14 wherein said database of monitored service level metrics further includes information selected from the group consisting of: the assigned disk space, what the user can access, how the user's request is fulfilled within the system or web farm, user's subscribed level of service or class, transaction, number of requests, download size, file size, file type, time of day, week or month, response time of the back end servers, response time of the web farm, and how long it takes to complete a specified request or file.

20. The method of claim 14 in which said classes of service level metrics are selected according to user class, host class, and virtual site class.

21. The method of claim 14 wherein the step of defining a hierarchy of service level classes is based on one of users, URLs and virtual sites.

22. The method of claim 14 wherein the step of defining service level classes of service comprises identifying a set of agreed-to metrics and associating said set of agreed-to metrics with one of a plurality of said service level classes of service.

* * * * *